J. W. IVORY.
ARTIFICIAL TOOTH.
APPLICATION FILED NOV. 27, 1908.

936,903.  
Patented Oct. 12, 1909.

Witnesses:  
Inventor  
James W. Ivory.  
By Diedersheim & Fairbanks  
Attorneys

UNITED STATES PATENT OFFICE.

JAMES W. IVORY, OF PHILADELPHIA, PENNSYLVANIA.

ARTIFICIAL TOOTH.

936,903.

Specification of Letters Patent.   Patented Oct. 12, 1909.

Application filed November 27, 1908. Serial No. 464,691.

*To all whom it may concern:*

Be it known that I, JAMES W. IVORY, a subject of the King of Great Britain, residing in the city and county of Philadelphia, State of Pennsylvania, have invented a new and useful Artificial Tooth, of which the following is a specification.

My invention consists of a novel means for anchoring artificial teeth in a dental plate and effectively connecting the same therewith, and other advantages are presented, as will be hereinafter described.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 16:
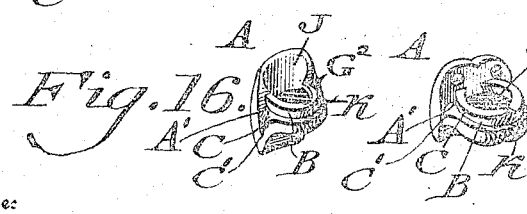
Figure 17:
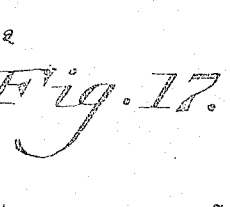

Figures 1, 4, 7, 10 and 13 represent perspective views of artificial teeth embodying the invention. Figs. 2, 5, 8, 11 and 14 represent edge views of the teeth respectively illustrated in Figs. 1, 4, 7, 10 and 13. Figs. 3, 6, 9, 12 and 15 represent central sections of the teeth respectively illustrated in Figs. 1, 4, 7, 10 and 13. Figs. 16 and 17 represent perspective views of other modifications.

Similar letters of reference indicate corresponding parts in the figures.

Figure 1:
Figure 2:
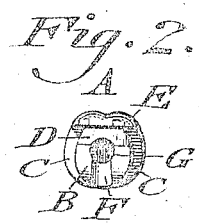
Figure 3:

Referring to the drawings—A, Figs. 1, 2 and 3, designates the body of an artificial tooth. Extending from the base of said body is the projection B, which is of less width than said body, thus forming the shoulder C, said shoulder forming an angle with the base of the outer rim of the body portion. The forward portion of the projection B is cut away, forming the channel D, which is adjacent to the inner wall E of the face of the tooth. On the base of the projection B, is the channel F, which extends at an angle to the channel D, said base having therein also the cavity G, one or more, which is interposed between the channels D and F. In the wall E are recesses H, it being seen that the projection B, shoulder C, channels D, F, cavity G and recesses H provide numerous means for the engagement of the material of the dental plate, the shoulder C forming an angular joint with said plate, so that the teeth will be well anchored in the plate and securely connected therewith. The projection B is of less diameter than the palatal biting or grinding base of the tooth, thus affording additional plate material strength between adjacent teeth and have the surfaces of the latter appear in natural form exteriorly. Furthermore, the cavity G extends deeply into the body of the tooth and has its side wall undercut to form a dove-tail joint with the plate, the line of the cavity being deeper than that of the shoulder of the projection B, by which provision the front or other portion of said projection may be ground down to fit a cast or shortened to fit a model, while the tooth may be readily anchored in the plate material.

Figure 4:
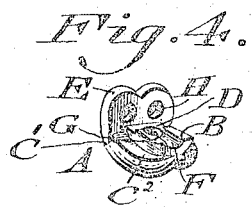
Figure 5:
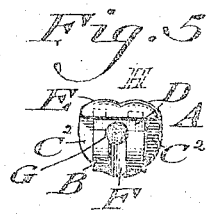
Figure 6:

Figs. 4, 5 and 6 substantially present the same characteristics as those in the previous figures, excepting that in the latter, the shoulder $C^2$ is rounded; while in the former it is rectangular.

Figure 7:
Figure 8:
Figure 9:
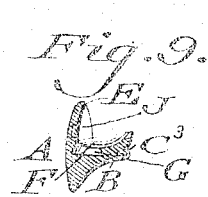

In Figs. 7, 8 and 9, the projection is shown heart-shaped, and the shoulder $C^3$ around the same is similarly shaped. The rear wall of the body has a recess J therein, the same communicating with the channel F in the face of the projection B.

Figure 10:
Figure 11:
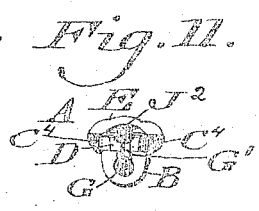
Figure 12:

In Figs. 10, 11 and 12, the projection B has sloping sides, forming the sloping shoulder $C^4$, the face having therein the cavity G and the channel D, the latter communicating with the recess J in the rear wall E of the body of the tooth.

Figure 13:
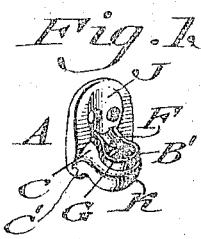
Figure 14:
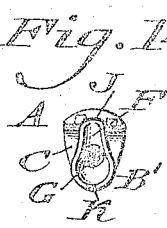
Figure 15:
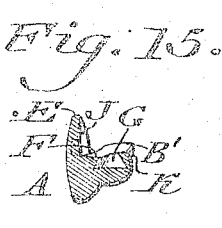

In Figs. 13, 14 and 15, the body has a somewhat pear-shaped projection B' and the shoulder conforms to the contour thereof. The face of said projection has also in it, the channel F and the cavity G, and in its margin, the notch K, said channel F being in communication with the recess J. The results in the constructions shown in these Figs. 4 to 15 inclusive are substantially the same as those shown in Figs. 1, 2 and 3.

In Figs. 16 and 17, the cavities $G^2$ are of increased diameters to form larger engagements for the material of the plate, and the inner sides of the walls of said cavities are also undercut as in the other figures, to provide locking surfaces with the material of the plate of the order of dove-tails, whereby the teeth are held with greater grip in the plate, and so rendered immovable and detachable under ordinary circumstances.

In Figs. 10, 11 and 12, I show the cavity G and recess $J^2$ joined by the channel G', whereby said cavity and recess are practically in communication.

On the sides of the lateral wall of the biting or grinding body of the tooth are the acute-angular depressions C', which are formed by cutting away the inner lateral walls of the face of an incisor or cuspid or molar to a point beneath the outer lateral cutting edge of an incisor or cuspid, or the front lateral cusps of a molar or bicuspid, having for its inner wall the converging base of the outer rim of the palatal or grinding portion of the body of the tooth, and having on its inner wall the shoulder C. The outer base of such depression is of less depth on a molar or bicuspid than on an incisor or cuspid or dependent on the width or depth of the crown, said depression assisting to overcome the outward strain in mastication, the plate material being moulded into said depression.

Attention is directed to the fact that the shoulder C extends from the inner wall E on the right lateral side thereof to the inner wall on the left lateral side and vice versa, and it is continuous with the outer rim of the base of the palatal or grinding body of the tooth.

During the fusing of the tooth, it is important to permit the escape of vapor therefrom. This is accomplished by the channel D, or if desired, by the perforations A', which, as in Figs. 16 and 17, extend from the cavity G laterally outward through the base of the projection B.

Having thus described my invention, what I claim as new and desire to secure by Letters Patent, is:—

1. An artificial tooth having on the base of the biting or grinding body thereof a projection of less width than the body of the tooth and extending in the longitudinal direction therefrom and a shoulder forming an angle with the outer rim of said base.

2. An artificial tooth having on the base of the biting or grinding body thereof a projection of less width than the body of the tooth and extending in the longitudinal direction thereof and forming a shoulder with said base, said projection having channels in the base thereof, the same extending at an angle to each other.

3. An artificial tooth having on the base of the palatal biting or grinding body thereof a projection extending in the longitudinal direction therefrom and forming a shoulder with the outer rim of said base, said projection having a channel and a cavity in the face thereof extending into the body of the tooth.

4. An artificial tooth having on the base of the palatal biting or grinding body thereof a projection extending in the longitudinal direction therefrom and forming a shoulder with the outer rim of said base, said projection having a channel in the base thereof, and the rear wall of said body having therein a recess.

5. An artificial tooth having on the base of the palatal biting or grinding body thereof a projection extending in the longitudinal direction therefrom and forming a shoulder with the outer rim of said base, the margin of said projection having a depression therein.

6. An artificial tooth having on the base of the palatal biting or grinding body thereof a projection of less width than the body of the tooth and extending in the longitudinal direction therefrom and forming a shoulder with the outer rim of said base, said projection having a channel and a cavity in the base of said projection, the inner wall of the same being undercut.

7. An artificial tooth formed with a projection with channel and having on a side of the lateral wall of the biting or grinding body thereof an acute-angular depression.

JAMES W. IVORY.

Witnesses:
JOHN A. WIEDERSHEIM,
HARRY C. DALTON.